United States Patent

[11] 3,590,750

| [72] | Inventor | Pierre Lamy<br>4000 Gaboury St., Chomedey, Laval,<br>Quebec, Canada |
|------|----------|---|
| [21] | Appl. No. | 809,734 |
| [22] | Filed | Mar. 24, 1969 |
| [45] | Patented | July 6, 1971 |

[54] MACHINE FOR MAKING CONSISTENT ICE CREAM CONES
11 Claims, 9 Drawing Figs.

| [52] | U.S. Cl. | 107/48 R |
|------|----------|----------|
| [51] | Int. Cl. | A47j 43/28 |
| [50] | Field of Search | 107/1, 8, 48, 27, 53 |

[56] References Cited
UNITED STATES PATENTS

| 2,716,385 | 8/1955 | Tarr | 107/8 |
| 2,728,306 | 12/1955 | Tarr | 107/8 |
| 2,899,988 | 8/1959 | Stanley | 107/48 X |

Primary Examiner—Louis K. Rimrodt
Attorney—Pierre Lesperance

ABSTRACT: A machine for making consistent ice cream cones wherein a scoop mechanism which is solely vertically movable is adapted to take ice cream from a bulk ice cream supply disposed on a turntable a mechanism being adapted to sequentially rotate and radially shift the turntable and a scooped ice cream transport mechanism being provided to transport the scooped ice cream from the scoop mechanism to a cone support where the scooped ice cream is deposited in an empty cone placed on the cone support.

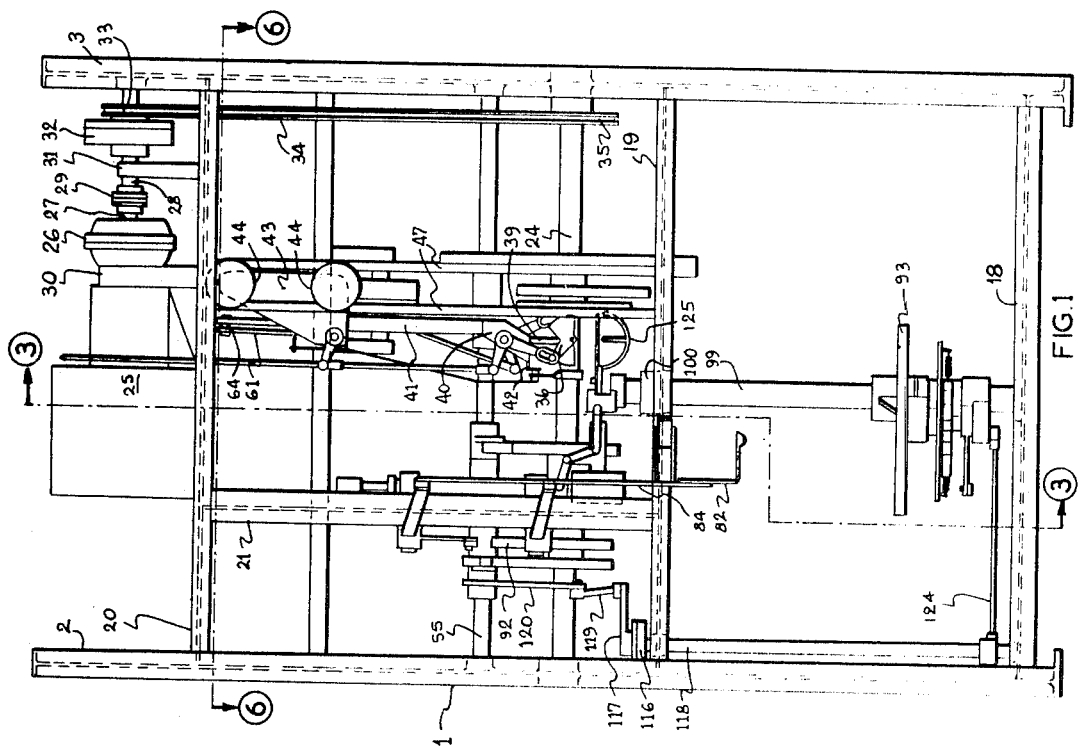

*INVENTOR*
Pierre LAMY
BY
Pierre Lespérance

*PATENT AGENT*

INVENTOR
Pierre LAMY

MACHINE FOR MAKING CONSISTENT ICE CREAM CONES

The present invention relates to a machine for making ice cream cones more particularly relating to a machine to automatically scoop consistent ice cream from a bulk ice cream supply and deposit the same in an ice cream cone.

Up to now it has been current practice to manually make consistent ice cream cones, even when a large number had to be prepared.

It is therefore an object of the invention to provide a machine to make ice cream cones.

Another object of the invention is to provide a machine adapted to make consistent ice cream cones rapidly and efficiently.

More specifically, the main object of the invention is to provide a machine whereby consistent ice cream is automatically scooped from a bulk ice cream supply and deposited in a cone which is placed at a cone support station.

A further object of the invention is to provide a machine for making consistent ice cream cones having a transport mechanism for the scooped ice cream from a scoop to a cone support.

Another object of the invention is to provide a machine for making ice cream cones having a sensor adapted to control the excursion of a scoop for the ice cream.

Another object of the invention is to provide a machine for making ice cream cones having a bulk ice cream support adapted to be shifted and rotated in order to evenly scoop the ice cream across the top surface of a bulk ice cream supply.

The invention will be described in greater detail by reference to the accompanying drawings, wherein:

FIG. 1 is a front elevation view of a machine according to the invention;

FIG. 2 is a side view as seen from the left in FIG. 1;

Figure 3:
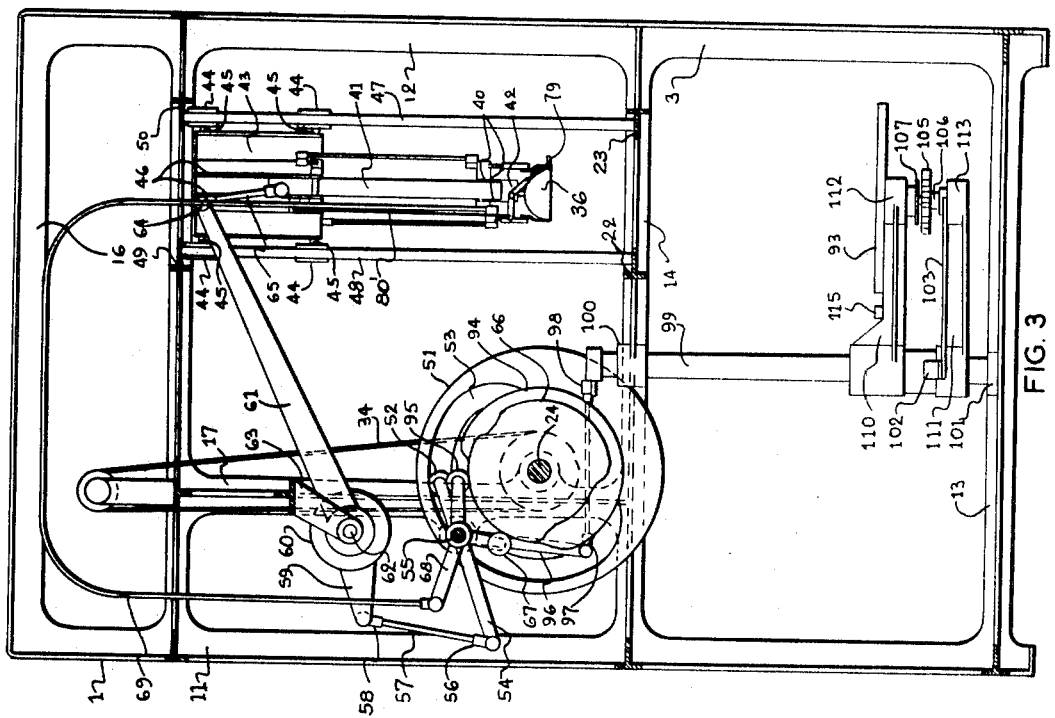
FIG. 3 is a cross-sectional view taken along line 3–3 of FIG. 1.

Referring now more particularly to FIGS. 1, 2, and 3, the invention is embodied in a machine comprising a frame 1 adapted to support the various mechanisms forming part of the machine. In the drawings, the frame is illustrated as being constructed of metal, but it must be pointed out that wood or other rigid material could be used as well.

Frame 1 comprises two side panels 2 and 3. Side panel 2 is constituted of angular posts 4 and 5 separated by four traverses 6, 7, 8, and 9 and having shafts supporting upright 10 extending between traverses 7 and 8. Side panel 3 is constituted of angular posts 11 and 12 separated by traverses 13, 14, 15, and 16 and having a shaft-supporting upright 17 extending between the traverses 14 and 15.

Figure 6:
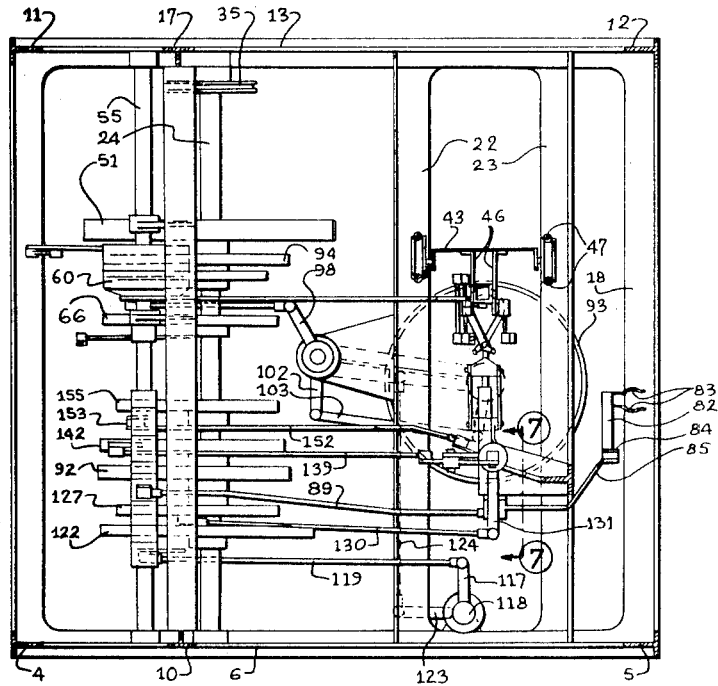
FIG. 6 is a cross section view as seen in the direction of the arrows along line 6–6 in FIG. 1.

Spacers 18, 19, and 20 rigidly connect the side panels 2 and 3 to each other. Another upright 21 is rigidly connected between spacers 19 and 20. As seen in FIGS. 3 and 6, a pair of crossbeams 22 and 23 extend between traverses 7 and 14 and are rigidly connected thereto. The frame structure has been described in detail for the sake of clarity to help to more readily understand the drawings. It is obvious that other frame structures could be used as well and the applicant does not wish to be limited to the specific structure described and illustrated.

A transverse shaft 24 is journaled in the shaft-supporting uprights 10 and 17. Shaft 24 is provided to transmit motion to all the mechanisms forming part of the machine illustrated.

A power unit 25 is provided to transmit rotation to the transverse shaft 24. The power unit 25 comprises a variable speed drive 26 adapted to cause rotation of output shaft 27 and to the shaft extension 28 axially coupled to output shaft 27 by a conventional shaft coupling 29.

Axially coupled shafts 27 and 28 are mounted in bearing units 30 and 31. A clutch 32 is connected to shaft 28 and is adapted to be selectively operated to disengage a sprocket wheel 33 in order to suspend or stop the operations of the various mechanisms cooperatively associated into the machine.

A chain 34 is provided to transmit the rotation of the sprocket wheel 33 to the transverse shaft 24 by means of a sprocket wheel 35 rigidly mounted on the latter. An array of cams is provided such that they are fixedly mounted on shaft 24 for bodily movement with the latter. The arrangement of all the cams on the same shaft 24 assures perfect synchronism between the cams and the associated mechanism, as will be defined in detail later.

Each cam is profiled to control a specific movement of the machine. The specific function of each cam will be explained later in conjunction with the detailed description of the associated mechanism.

Figure 5:
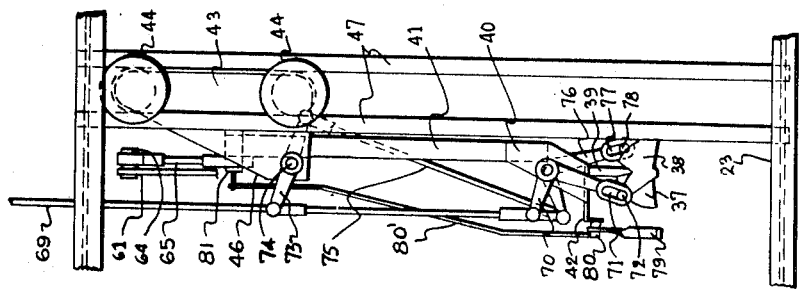
FIGS. 4 and 5 are front and side views respectively of a scoop mechanism for the ice cream.
Figure 4:
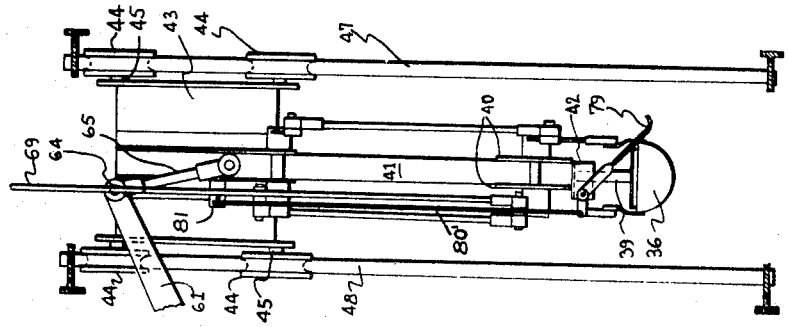

An ice cream scooping mechanism forms part of the machine, as best shown in FIGS. 4 and 5. The scoop mechanism includes a scoop 36 having a pair of movable jaws 37 and 38, which are pivotally maintained on a supporting post 39. The latter is fixed to the lower portion of a U-shaped supporting bracket 40 fixed such that the legs of the U project on two opposite sides of the lower end of a vertically extending column 41. The bridging portion extending between the legs of the U-shaped supporting bracket 40 forms a supporting bracket 42.

The column 41 is fixed to a vertically movable carriage 43, which is rollably mounted by means of two pairs of circumferentially grooved guide wheels 44 assembled on a pair of axles 45. A pair of flanges 46 are fixed to the carriage 43 and extend therefrom in spaced-apart relationship for a purpose to be defined later.

Guide wheels 44 are mounted for vertical displacement between two pairs of parallel guides or rods 47 and 48 fixed at their ends to the frame 1, more particularly to crossbeams 22, 23 and 49, 50.

Control linkages are adapted to transfer movement from the transverse shaft 24, via two cams fixedly attached thereto, to the carriage 43 and the movable jaws 37 and 38 of the scoop 36. The linkage system adapted to control the vertical displacement of the carriage 43, includes a cam 51 and a cam follower 52 positively guided in a groove 53 of cam 51. The cam follower 52 is mounted on one end of a cam follower lever 54, which is pivoted intermediate its ends on a pivot rod 55. The other end 56 of the cam follower lever 54 is pivotally connected to one end of a push pull link 57, the other end of which is in turn pivotally connected at 58 to a crank arm 59, which is connected through a clutch 60 to a further crank arm 61. Clutch 60 is mounted on a shaft 62 carried by a U-shaped bracket 63. Crank arms 59 and 61 are mounted for pivotal movement around the shaft 62. The end 64 of crank arm 61 is pivotally connected to one end of a push-pull link 65, which is in turn pivotally connected at its other end to the upper portion of the vertical column 41.

It will be readily seen that a selected profile of the groove 53 will produce a desired sequential up-and-down translation of the carriage 43 and of the attached scoop 36. The clutch 60 is provided to arrest the carriage 43 and the scoop 36 at intermediate positions short of the downmost position, as will be defined later.

The opening and closing of the jaws 37 and 38 is accomplished as follows, with particular reference to FIGS. 3, 4, and 5.

A cam 66 is provided to cooperate with a cam follower 67 mounted at one end of a cam follower lever 68 pivotally mounted on pivot rod 55. At the other end of the cam follower lever 68, one end of a Bowden cable 69 is connected, the other end of the latter being pivotally connected to one end of a bellcrank 70, while the other end thereof is terminated by an enlargement having an elongated slot 71 adapted to receive a stud 72 therein for lateral displacement of the latter along said slot 71.

A motion-reversing lever 73 is pivotally mounted on a pivot 74 passing through flanges 46 and retained thereby. One free end of the motion-reversing lever 73 is pivotally connected to the Bowden cable 69 intermediate the ends thereof such as to receive the movement thereof. The opposite free end of the motion-reversing lever 73 is pivotally connected to one end of a push-pull link 75. The other end of the latter is pivotally connected to one arm of a bellcrank 76, while its other arm terminates by an enlargement defining an elongated slot 77 which receives a stud 78 therein for lateral displacement of the latter along said slot 77. Studs 72 and 78 are fixed to jaws 38 and 37 respectively for bodily movement therewith.

It will thus be seen that the rotation of the scoop-actuating cam 66 causes longitudinal displacement of the core of the Bowden cable within its envelope, resulting in either opening or closing of the jaws 36 and 38 through opposite rotational movement of the bellcranks 70 and 76.

A feeler arm 79 is pivotally mounted on a stud pivot 80 fixed to bracket 42. A rod 80′ connects one end of the feeler arm 79 to a switch 81 adapted to control the clutch 60 upon engagement of the free end of the feeler arm 79 with the top surface of the bulk ice cream supply, such that the above-mentioned engagement will cause stopping of the downward movement of the carriage 43, this in order to determine a correct scooping position for the jaws 37 and 38.

A cone support 82 in the form of two cone gripping fingers 83 is fixed to a supporting rod 84, itself pivotally supported at two of its points by a pair of substantially parallel crank arms 85 and 86. The crank arm 85 is part of a bellcrank which is pivoted at 87 on the frame 1. The second crank arm 88 of the latter bellcrank is pivotally connected to one end of a push-pull link 89, the other end of which is likewise pivotally connected to a follower lever 90 having a follower 91 held in running contact with a cone support-controlling cam 92. The follower lever 90 is also pivotally mounted on pivot rod 55. Upon rotation of the cam 92, the associated follower 91 is caused to follow the peripheral contour of the cam 92, resulting in a desired and a predetermined to-and-fro movement of the follower lever 90, the push-pull link 89, the crank arms 85 and 88 and the cone support 82 for a purpose to be defined later.

A bulk ice cream container support is provided, which comprises essentially a turntable 93 and a mechanism adapted to rotate and shift the above turntable 93. A cam 94, also mounted on transverse shaft 24 for bodily movement therewith, cooperates with a cam follower 95 mounted on a cam follower lever 96, the latter being pivotally mounted on the pivot rod 55. A push-pull link 97 has one end pivotally connected to cam follower lever 96, while its other end is connected to a crank arm 98 fixed to a vertical shaft 99 supported by bearing units 100 and 101. A crank arm 102 is fixed to shaft 99 to rotate therewith. A push-pull link 103 is pivotally connected to crank arm 102 and to a crank arm 104 fixed to a diametrical arm 107 rotatable on shaft 106. Arm 107 carries a pair of pawls 108, which are pivoted on the diametrical arm 107 in order to engage the teeth of the ratchet 105 secured to shaft 106. Turntable 93 is secured to shaft 106. A spring 109 is provided for each pawl 108 to bias the same into engagement with the ratchet 105. The turntable shaft 106 is supported by a pair of shaft support arms 110 and 111, which are pivotally supported on shaft 99 and determine two vertically aligned bearings 112 and 113 for shaft 106. The above-described mechanism to rotate the turntable 93 operates such that rotation of cam 94 causes rotary reciprocation of the cam follower lever 96, shaft 99 and crank arms 102 and 104, and diametrical arm 107, resulting step-by-step 360° rotation of the turntable 93, which is fixed to shaft 106.

When the circular turntable 93 has been rotated step-by-step 360°, the ice cream has been scooped on a determined circumference at the top surface of the bulk ice cream supply. In order to produce the same scooping operation but on a different circumference, a mechanism is provided to radially shaft the position of the circular turntable 93.

Figure 9:
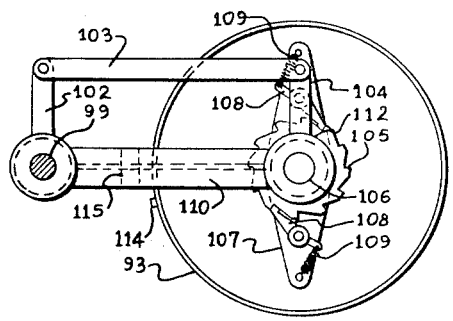
FIG. 9 is a bottom view of a support mechanism for a bulk ice cream container.
Figure 7:
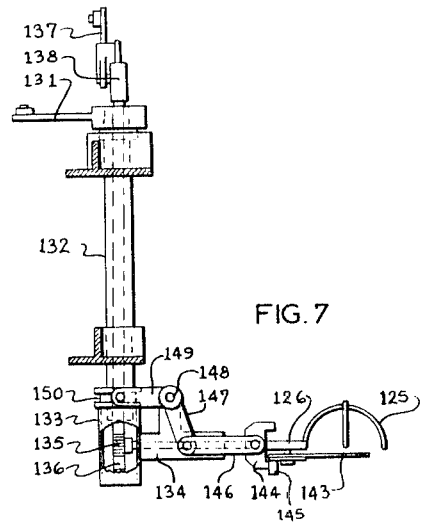
FIG. 7 is a partial cross section view as seen along line 7–7 of FIG. 6.
Figure 8:
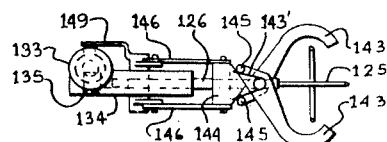
FIG. 8 is a bottom view of FIG. 7.

A finger 114, fixed on the periphery of the turntable 93, as seen in FIG. 9, is adapted to trigger a switch 115 mounted on the shaft-supporting arm 110. Therefore, upon each revolution of the turntable 93 and the associated bulk ice cream container, switch 115 is actuated, causing engagement of clutch 116 (see (FIGS. 2 and 6) and hence coupling of a crank arm 117 with a shaft 118. The crank arm 117 is connected to a push-pull link 119, itself pivotally connected to a cam follower lever 120 pivoted on the follower lever pivot 55. The follower lever 120 has a cam follower 121 in running engagement with a corresponding cam 122. A crank arm 123 is fixedly connected at the lower end of shaft 118. A push-pull link 124 interconnects the crank arm 123 to the shaft support arm 111. It should be noted that upon actuation of the switch 115, the clutch 116 is engaged and the cam 122 causes actuation of the cam follower 120, link 119, shaft 118, crank arm 123 and link 124, which causes shifting of the shaft-supporting arms 110 and 111, resulting is a slight radial shifting of the turntable 93. Turntable 93 repeats its step-by-step rotation for a second cycle, but now the removal of ice cream by scoop 36 is effected along an annular path or circumference of another diameter than the removal path of the first cycle. Therefore, the angle of rotation of the turntable for each step is different than during the first cycle. Consequently, the stroke of link 103 will be different. For this purpose, and supposing that two cycles are sufficient for the scoop to remove one complete layer of ice cream from the container, cam 94 is made as a double cam and cam follower 95 is shiftable so as to be shifted at the end of the first cycle from engagement with one cam section to engagement with the other cam section by means of an electromagnet operated by the same switch 115, which operates the turntable-shifting mechanism.

A mechanism is provided to transport the ice cream from the scoop 36 to the cone support 82. The transport mechanism for the scooped ice cream comprises a transporting element 125 fixed at the end of a pivot 126. A cam 127 cooperates with a cam follower 128 to actuate a cam follower lever 129 pivotally mounted on pivot rod 55. A push-pull link 130 is one of its ends to the cam follower lever 129 and at its other end to a crank arm 131 fixed to the tubular shaft 132 to which are attached a hub 133 and a radial projection 134 within which is pivoted the pivot 126. Rotation of cam 127 will therefore determine sequential rotation of the scooped ice cream support 125 around the axis of the tubular shaft 132 between the scoop 36 and the cone support 82.

The scooped ice cream has the approximate shape of a half-sphere with a somewhat flattened face turned upwardly. The flattened face must be turned downwardly in order to be placed inwardly on the cone. A pinion 135 is fixed on the end of pivot 126 and meshes with a toothed rack 136 slidably mounted inside the tubular shaft 132. A bellcrank 137, articulated on frame 1, is pivotally connected to an enlargement 138 at the upper end of the toothed rack 136 and to one end of a push-pull link 139. The latter is pivotally connected at its other end to a cam follower lever 140 pivoted on axle 55. The cam follower lever 140 has a cam follower operatively associated to a cam 142. Rotation of the latter causes actuation of the cam follower lever 140 and through link 139 of the rank 136 and pinion 135, resulting in pivoting of pivot 126 on itself. Scissors 143 are mounted on the scooped ice cream transport mechanism in order to retain the scooped ice cream in association with the transporting element 125 when the latter is in inverted position. The scissors 143 are sequentially opened and closed at the appropriate time to either retain the scooped ice cream or to allow the latter to drop unto or off the supporting element 125. A wedge 144 is inserted between a pair of rollers 145 mounted on one end of each of the two branches of the scissors. Scissors 143 are urged into closed position by a spring 143'. A pair of push-pull links 146 connect the wedge 144 to a forked bellcrank 147, which is articulated at 148 on the radial projection 134 of hub 133. A free end 149 of the forked bellcrank 147 is connected to a grooved ring 150 slidably mounted on tubular shaft 132. A bellcrank 151, pivoted on frame 1, (see FIG. 2) engages grooved ring 150 and is actuated by a push-pull link 152 pivotally connected to a cam follower lever 153, also pivoted on pivot rod 55. A cam follower 154 is mounted on the cam follower lever 153 to run on the periphery of a profiled cam 155, whereby the rotation of the latter will cause sequential up-and-down sliding of the grooved ring 150 and opening and closing of the scissors 143.

OPERATION OF THE MACHINE

An empty ice cream cone being deposited on the cone support 82, the automatic operation of the machine is initiated by energizing the variable speed drive 26 and engaging the clutch 32. There results a rotation of the transverse shaft 24 and sequential rotation of all the cams which, as described previously, are all mounted on shaft 24 for bodily movement therewith. The carriage controlling cam 51 starts the operations by causing downward displacement of the carriage 43 until feeler arm 79 contacts the top surface of a bulk ice cream supply previously placed on the turntable 93. Contact of the feeler arm 79 with the bulk ice cream causes disengagement of the clutch 60 and stopping of the carriage 43. The jaws 37 and 38 of the scoop 36 initially in the fully open position, as in FIG. 1 and FIG. 5, are then activated by their associated cam 66 to take a scoop of ice cream from the bulk ice cream supply which is then within reach of the jaws of the scoop 36. When the latter is completely closed, a finger, not shown, suitably positioned on cam 66, acts on a switch, not shown, to engage clutch 60 and to cause the carriage 43 to return to its starting uppermost position. The scooped ice cream transport element 125 then arrives under the scoop 36 with the branches of the scissors 143 in the open position. The carriage 43 subsequently goes down slightly and the scoop 36 enters in the ice cream supporting element 125, the jaws open and the carriage 43 returns to the starting uppermost position, leaving the scooped ice cream in the transporting element 125. The scissors 143 then close under actuation by cam 155 and the transport mechanism is actuated by cam 127, causing rotation of the transporting element 125 around tubular shaft 132. During that rotation, the transporting element 125 is inverted, that is turned 180° around the longitudinal axis of its pivot 126 under the action of cam 142 on the toothed rack 136 and the associated pinion 135. When the transporting element 125 is above the cone support 82, the latter is moved upwardly and the scissors 143 open quickly to deposit the scooped ice cream in the mouth of the ice cream cone previously placed on said cone support 82. In order to complete the cycle of operation of the machine and to have the latter ready for subsequent operation, the cone support moves down to its starting position while the scooped ice cream supporting element 125 moves back a limited distance towards the scoop 36.

I claim:

1. In an ice cream dispenser, in combination, a scoop consisting of a pair of movable jaws, feeler means associated with said scoop, a turntable mounted under said scoop for supporting an open top circular ice cream container, means for bodily moving said feeler means and said scoop in a vertical path only downwardly into and upwardly out of a circular open top ice cream container supported on said turntable, means controlled by said feeler means to stop downward movement of said scoop upon said feeler means contacting ice cream in said container, means for opening and closing said jaws operative at an upper station and at lower stations respectively, means for rotating said turntable step by step operative when said scoop is out of contact with ice cream in said container, means for shifting said turntable radially with respect to the vertical path of said scoop operative upon completion of a 360° rotation of said turntable, and control means sequentially interrelating the operation of said means for bodily moving said feeler means and said scoop, said means for opening and closing said jaws, and said turntable-rotating means, so that said scoop and feeler means move down into said container until said feeler means contact the ice cream in the stationary container, causing said feeler means controlled means to stop further downward movement of said scoop, then a quantity of ice cream is collected by said scoop upon closing of its open jaws at one of said lower stations, then said scoop moves upwardly to said upper station where said jaws open to release said quantity of ice cream and said turntable rotates one step, thus completing a first scooping operation, then successive scooping operations are effected until one 360° rotation of said turntable is completed, resulting in the removal of a first annular layer of ice cream from said container to thereby complete a first cycle of scooping operations in a first circular zone of the container, then said turntable-shifting means shift said turntable into another position and successive scooping operations are effected until another cycle of scooping operations is completed in another circular zone of the container, and once a complete layer of ice cream has been removed from the container, successive cycles of scooping operations are effected at progressively lower levels in the container.

2. In an ice cream dispenser as claimed in claim 1, wherein said means for bodily moving said feeler means and said scoop include a carriage having rolling elements operatively associated to vertically extending guides, a first rotation controlling cam and a first linkage system including a clutch operatively connecting said carriage to said first controlling cam, such that rotation of the cam will actuate the linkage and cause up-and-down displacement of the carriage, said jaws being pivotally carried by said carriage and said feeler means further including a feeler arm carried by said carriage adjacent said pair of jaws, said feeler arm being connected to said clutch to disengage the same upon contact of the feeler arm with the ice cream in said container.

3. In a ice cream dispenser as claimed in claim 2, wherein said means for opening and closing said jaws include a flexible cable, a second controlling cam and a cam follower lever operated by said second controlling cam, said flexible cable connected to said cam follower lever and to said pivoted jaws.

4. In an ice cream dispenser as claimed in claim 3, wherein said means for rotating said turntable include a ratchet connected to said turntable, a pawl for rotating said ratchet, a second linkage system connected to said pawl and a third cam for actuating said second linkage system, which causes progressive rotation through said pawl of the ratchet and turntable.

5. In an ice cream dispenser as claimed in claim 4, wherein said means for shifting said turntable include a pivoting arm rotatably carrying said turntable, a third linkage system connected to said pivoted arm and including a clutch and a fourth cam to which said third linkage system is connected, and means on said turntable to cause engagement of said last-named clutch upon said turntable having completed a full rotation to cause said fourth cam to shift said turntable.

6. In an ice cream dispenser as claimed in claim 5, wherein said control means include a power rotatable operated shaft on which said first, second, third, and fourth cams are secured.

7. In an ice cream dispenser as claimed in claim 6, further including a support to receive a cone for ice cream and a transport mechanism movable between a position underneath the scoop at its upper station to receive a quantity of ice cream therefrom to a position above a cone placed on said support, means to move said transport mechanism between said two positions and means to vertically move said cone support, said control means interrelating the operation of all the last-mentioned means to the operation of the first-mentioned means, and wherein said transport mechanism comprises a pivotally mounted transporting element and scissors cooperatively mounted on said transporting element, a vertically rotatably mounted tubular shaft, said transporting element and scissors being carried by the free end of a radial arm secured to said radial shaft, a fifth power-operated rotatable cam and a fourth linkage system connected between said tubular shaft and said fifth cam to cause rotation of said tubular shaft.

8. In an ice cream dispenser as claimed in claim 7, wherein said transporting element has a pivot extending therefrom, said pivot extending through said radial arm whereby said transporting element can pivot about a substantially horizontal plane between an upright and an inverted position, a pinion secured to said pivot, a tooth rack meshing with said pinion and mounted within said tubular shaft for lengthwise movement to rotate said transporting element, a power-operated sixth cam and a fifth linkage system connecting said sixth cam to said rack to cause lengthwise movement of said rack and, consequently, rotation of said transporting element.

9. In an ice cream dispenser as claimed in claim 8, wherein said scissors have two branches pivoted on said radial arm for movement across said transporting element between closed and open position to retain ice cream in said supporting element and release the same respectively, a wedge cooperating with said two branches to push them apart and open the scissors, a power-operated seventh cam and a sixth linkage system connected to said wedge and to said seventh cam, whereby said seventh cam actuates said scissors.

10. In an ice cream dispenser as claimed in claim 9, wherein said means to vertically move said cone support include a power-operated eighth cam and a seventh linkage system connected to said eighth cam and to said cone support for moving the latter up and down, said fifth, sixth, seventh and eighth cams being all mounted on said common power-operated shaft.

11. In an ice cream dispenser as claimed in claim 1, further including a support to receive a cone for ice cream and a transport mechanism movable between a position underneath the scoop at its upper station to receive a quantity of ice cream therefrom to a position above a cone placed on said support, means to move said transport mechanism between said two positions and means to vertically move said cone support, said control means interrelating the operation of all the last-mentioned means to the operation of the first-mentioned means.